United States Patent [19]

McMurtry

[11] Patent Number: 4,991,304

[45] Date of Patent: Feb. 12, 1991

[54] WORKPIECE INSPECTION METHOD

[75] Inventor: David R. McMurtry, Wotton-Under-Edge, United Kingdom

[73] Assignee: Renishaw, Gloucestershire, England

[21] Appl. No.: 305,727

[22] PCT Filed: Jun. 10, 1988

[86] PCT No.: PCT/GB88/00455

§ 371 Date: Jan. 26, 1989

§ 102(e) Date: Jan. 26, 1989

[87] PCT Pub. No.: WO88/09915

PCT Pub. Date: Dec. 15, 1988

[30] Foreign Application Priority Data

Jun. 11, 1987 [GB] United Kingdom ............... 8713715

[51] Int. Cl.5 ............................................. G01B 5/03
[52] U.S. Cl. .................................... 33/505; 33/504; 33/1 M; 33/545
[58] Field of Search ............... 33/503, 556, 557, 558, 33/559, 560, 561, 572, 832, 545, 546, 1 M, 505, 504; 364/560

[56] References Cited

U.S. PATENT DOCUMENTS

| 3,555,254 | 1/1971 | Gerber | 364/474.35 |
| 3,571,934 | 3/1971 | Buck | 33/832 |
| 3,654,446 | 4/1972 | Gordon et al. | 364/571.05 |
| 4,153,998 | 5/1979 | McMurtry | 33/566 |
| 4,158,919 | 6/1979 | McMurtry | 33/556 |
| 4,325,489 | 4/1982 | Russell et al. | |
| 4,333,238 | 6/1982 | McMurtry | 33/504 |
| 4,339,482 | 7/1982 | Glaser et al. | |
| 4,455,755 | 6/1984 | Fritsche et al. | 33/504 |
| 4,611,156 | 9/1986 | Feichtinger | 318/632 |
| 4,665,625 | 5/1987 | Ireland et al. | 33/503 |
| 4,866,643 | 9/1989 | Dutler | 364/571.02 |
| 4,884,889 | 12/1989 | Beckwith, Jr. | 33/1 M |

FOREIGN PATENT DOCUMENTS

| 0205166 | 6/1986 | European Pat. Off. | |
| 0228052 | 12/1986 | European Pat. Off. | |
| 73495 | 3/1989 | European Pat. Off. | |
| 57-501554 | 8/1982 | Japan | |
| 0037505 | 3/1983 | Japan | 33/572 |
| 0127110 | 9/1983 | Japan | 33/559 |
| 0170713 | 9/1984 | Japan | 33/559 |
| 04706 | 10/1985 | PCT Int'l Appl. | |
| 2045437 | 10/1980 | United Kingdom | |
| 2166266 | 4/1986 | United Kingdom | |

Primary Examiner—Allan N. Shoap
Assistant Examiner—Alvin Wirthlin
Attorney, Agent, or Firm—Oliff & Berridge

[57] ABSTRACT

A succession of nominally identical workpieces is measured using a probe on a coordinate measuring machine. To enable most of the workpieces to be probed at a fast speed (step 40), and compensate for the errors thereby introduced, one workpiece is also probed at a slow speed (step 32). For that workpiece, a series of error values is calculated (step 36) from the differences between the fast and slow measurements. The subsequent fast measurements on succeeding workpieces are corrected by making use of these error values (step 42).

11 Claims, 1 Drawing Sheet

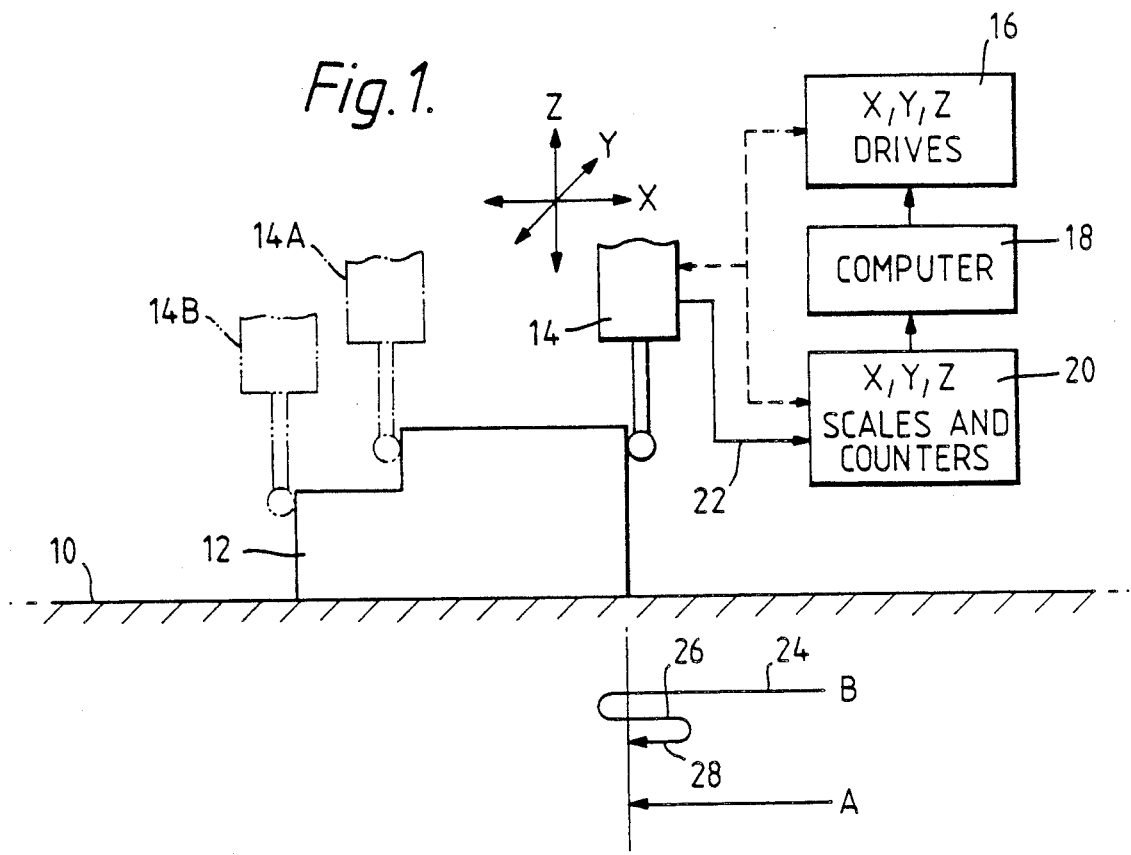
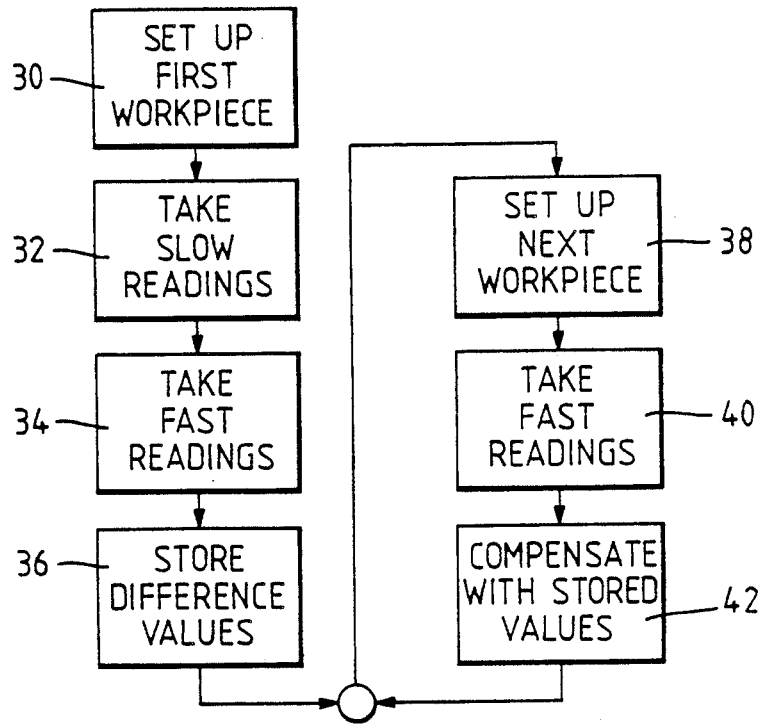

WORKPIECE INSPECTION METHOD

BACKGROUND OF THE INVENTION

This invention relates to co-ordinate measuring for inspecting the dimensions of workpieces.

It is common practice, after workpieces have been produced, to inspect them on a co-ordinate measuring machine (CMM) having a quill which can be driven in three orthogonal directions, X,Y,Z, within a working volume of the machine. The quill may carry a touch trigger probe of the type described in U.S. Pat. No. 4,153,998 (McMurtry) which produces a trigger signal when its stylus touches a surface of the workpiece being inspected. This trigger signal is used to freeze the readings of scales or resolvers which indicate the X,Y and Z positions of the quill of the CMM, to indicate the X,Y and Z co-ordinates of the position of contact. Commonly, the CMM includes a computer program to take a series of readings of co-ordinate data at various locations on the workpiece, in order to perform a complete inspection of desired dimensions of the workpiece. A determination can then be made as to whether the workpiece is of acceptable quality, or whether it should be rejected.

The probes used in such applications are capable of great repeatability. However, it is known that they suffer from pre-travel. This is an inaccuracy caused by the slight delay between the instant of stylus contact with the workpiece and the generation of the trigger signal. It is exacerbated by the unavoidable delay in the response time before occurrence of the trigger signal causes freezing of the scale outputs and the taking of a reading. However, since the probe operates in a repeatable manner, this inaccuracy will generally be constant for a given direction and speed of approach of the probe to the workpiece.

Another cause of inaccuracy lies in the CMM itself. As the probe-carrying quill is accelerated and decelerated in the three dimensions, the structure of the machine is subject to deflection under dynamic loadings. The amount of such deflection depends on the instantaneous direction and speed of probe movement, and on the instantaneous X,Y,Z position in the working volume of the machine.

The solution to these problems which has been adopted to date involves causing the probe to travel very slowly as it contacts the workpiece surface. This reduces inaccuracies caused by the dynamic deflections and the pre-travel of the probe. Prior to taking any measurements, it is also usual to include a calibration or "datuming" cycle, in which the probe is calibrated by touching surfaces of a reference object at the slow speed. This enables the calculation of offsets which are stored and used to correct subsequent measurement readings for such factors as the diameter of the probe stylus. If the reference object is touched in each direction of probing movement, such a datuming cycle can also correct for the probe pre-travel in each such direction, but not for the dynamic deflections which vary from place to place within the working volume.

However, the process of inspecting a workpiece would take a very long time if the probe always moved at such a slow speed. Accordingly, a technique which has been used involves moving the probe at a high speed until it contacts the workpiece surface. This gives an approximate indication of the location of the workpiece surface. The probe is then reversed out of contact, then moved back into contact at a slow speed to obtain an accurate reading of its position. Such a technique enables a workpiece to be inspected faster than if the probe were always moved at a slow speed, though obviously the double touching at each inspection location (once at a high speed and once at a low speed) does take up time.

U.S. Pat. No. 4,333,238 (McMurtry) shows an alternative solution, in which the dynamic deflections are determined by sensing the accelerations of the structure of the CMM. However, this requires that an accelerometer should be specially provided and calibrated to sense the accelerations.

In place of the trigger probes discussed above it is also known to scan the contour of a workpiece surface with a measurement probe (i.e. one which continually determines the position of the surface relative to the body of the probe). An example is seen in U.S. Pat. No. 4,158,919 (McMurtry). The analogue or digital output of such a probe is added to the X,Y,Z outputs of the CMM's scales or resolvers to give the position of the surface. Of course, if the structure of the CMM is subject to dynamic deflections, these deflections will cause inaccuracies, just as they do with touch trigger probes. This is increasingly a problem as equipment capable of higher and higher scanning speeds is developed.

SUMMARY OF THE INVENTION

The present invention, at least in a preferred embodiment, seeks to provide a fast, accurate inspection method in the case where a series of identical workpieces are to be inspected in succession. This is of course quite a common situation in normal production practice.

The present invention provides a method of inspecting a series of workpieces, in which a workpiece-sensing probe is moved into a position-sensing relationship with each workpiece and a position reading taken, the method comprising the following steps (in any suitable order):

(a) moving the probe into the position-sensing relationship with one said workpiece at a relatively slow speed, and taking a position reading, (b) moving the probe into said position-sensing relationship with said one workpiece at a relatively fast speed, and taking a position reading, (c) recording a difference value representing the difference between the two readings of steps (a) and (b), (d) moving the probe into said position-sensing relationship with another said workpiece at the fast speed, and taking a position reading, and (e) using said recorded difference value to compensate the reading taken in step (d).

It will be appreciated that the slow reading need not necessarily be taken on the first workpiece of the batch, provided readings taken on earlier workpieces at the fast speed can be recorded and subsequently compensated.

The above defined method is applicable not only to trigger probes, where the probe is moved into the position-sensing relationship from a remote position, but also to measurement or scanning probes where the probe is continually being moved through a succession of position-sensing relationships, with readings being taken at each, in a scanning process. The same scanning process is repeated (at the appropriate scanning speed) in order to perform steps (a), (b) and (d) of the method.

The method according to the invention (at least in its preferred form) takes advantage of the fact that not only any pre-travel of the probe, but also the dynamic deflections, will tend to be repeatable for a given position with the working volume and a given direction and speed of probe movement. With a series of substantially identical workpieces, the errors which they cause will be substantially identical.

BRIEF DESCRIPTION OF THE DRAWINGS

An example of a workpiece inspection method according to the present invention will now be described with reference to the accompanying drawings, wherein:

FIG. 1 is a schematic diagram of a co-ordinate measuring machine (CMM), and

FIG. 2 is a flow chart of the method.

DESCRIPTION OF PREFERRED EMBODIMENTS

The CMM shown in FIG. 1 comprises a table 10 upon which may be placed a workpiece 12. Preferably this is done by automatic means (not shown) which places each of a succession of substantially identical workpieces 12 from a production run in the same position and orientation on table 10. The CMM also comprises a touch trigger probe 14 of the type described in U.S. Pat. No. 4,153,998 (McMurtry). However, it is to be understood that other probes (including non-contact probes) may also be used. The probe 14 is mounted in a quill (not shown) of the machine for movement in X,Y and Z directions under the action of X,Y and Z drives 16, controlled by a computer 18. X,Y and Z scales 20 (which include counters for the outputs of the scales) show the instantaneous co-ordinates of the position of the quill in which the probe 14 is mounted in three dimensions. When the probe 14 sends a trigger signal on a line 22 indicating that it has contacted the surface of the workpiece 12, the counters of the scales 20 are frozen and the computer 18 takes a reading of the X,Y,Z co-ordinates of the workpiece surface.

As thus far described, the machine is conventional. The computer 18 contains a program which causes the probe 14 to contact the surface of the workpiece 12 at a plurality of different points, sufficient to take all the required dimensions of the workpiece for the inspection operation required. This is illustrated at 14A, 14B.

It is known that if the probe 14 approaches the workpiece 12 at a relatively fast speed, as illustrated graphically at A in FIG. 1, then the pre-travel of the probe and the dynamic deflections of the machine structure result in an inaccurate reading. Accordingly, the method utilised in the past is as illustrated at B in FIG. 1. Here, the probe first approaches the workpiece surface 12 at a fast speed, as illustrated by line 24, until the surface is detected. Then, the probe 14 is reversed out of contact with the workpiece (line 26), and finally it is advanced into contact with the workpiece (line 28) at a slower speed, so that a more accurate reading can be taken. Since this needs to be repeated for each contact point on each workpiece of the production run which is to be inspected, this is a time consuming operation.

Accordingly, referring to FIG. 2, the following procedure is used in the present inspection method.

Prior to any measurements, the probe 14 is calibrated or "datumed" for each intended direction of probing movement, by touching at the slower speed against a reference object such as a datum ball, in the conventional manner. This provides a set of correction offsets, as is well known, and these are stored in the computer 18 for future use.

At the start of the production run, the first workpiece 12 to be measured on the CMM is set up on the table 10 (step 30), and as mentioned previously this is preferably done by an automatic handling mechanism.

Next, in step 32, all the required points on this first workpiece are measured in the conventional manner, using the double touching method illustrated at B in FIG. 1. These readings are all corrected in the conventional manner by the computer 18, using the appropriate stored correction offset. The corrected readings are stored. All these readings on the first workpiece are then repeated at a fast speed, namely the method shown at A in FIG. 1 (step 34). If desired, these two steps can be performed at the same time, since the fast reading at each point on the workpiece surface can be taken at the time indicated by line 24 at B in FIG. 1, followed by the slow reading being taken as indicated at 28 in FIG. 1. The fast readings, of course, are not corrected using the stored offsets. Rather, when both readings have been taken for each point on this first workpiece, the differences between the two values for each point are calculated and stored (step 36). The result is that there is now stored an error value for each measured point, which not only takes account of the stylus radius and probe pre-travel at the slower speed (as provided by the conventional datuming) but also takes account of the different pre-travel at the faster speed and the dynamic deflections of the machine structure at the faster speed. These error values effectively form a map (over the probe path) of the systematic errors encountered during a probing cycle at the faster speed.

Next, at step 38, the first workpiece of the production run is removed and the next workpiece is set up in its place, again preferably using the automatic handling mechanism. On this workpiece, readings are taken only at the fast speed, using the method illustrated at A in FIG. 1, (step 40). The same fast speed is used as in step 34. It will be appreciated that these fast readings will be inaccurate for the reasons discussed above. However, the readings can be expected to be repeatable even though they are inaccurate. This is particularly the case where the probe is always approaching a given point on the workpiece surface from the same direction at the same speed, and especially if the workpiece is located at the same position on the machine. Accordingly, in step 42, the computer 18 adjusts each of the fast readings taken at step 40 by adding in the corresponding difference value (error value) stored at step 36. This compensates for the errors induced by the fast reading. The computer 18 can then signal whether or not the workpiece is acceptable (i.e. within a predetermined tolerance) and if desired can print out the results of the measurements.

The procedure of steps 38, 40 and 42 is then repeated for each workpiece in the production run which is to be inspected.

It will be appreciated that the various steps of the method could be taken in various different orders. Not only can steps 32 and 34 be combined as mentioned above, but it is not really necessary for the slow readings of step 32 to be taken on the first workpiece of the run. Provided the various fast readings taken in step 40 are stored for subsequent compensation, the slow readings can be taken at any time, and the compensation step 42 made subsequently. Indeed, the difference values provided by step 36 could have been stored in the computer from a different production run on identical workpieces 12, perhaps performed on a different day.

The advantage of the method described is that readings on the majority of the workpieces of the production run are taken at the fast speed, and so there is an overall saving of time.

The method has been described in respect of a co-ordinate measuring machine. However, the method is equally applicable if the probe is mounted in a different type of inspection machine, such as an inspection robot. Trigger probes are also well known for use on computer numerically controlled machine tools. In such use, the probe is used during part of the machining cycle which is stored as a part program in the numerical control. It is perfectly possible to use the method of FIG. 2 in such a part program. The steps of setting up the various workpieces (steps 30 and 38) then also include steps of cutting metal from the workpiece in accordance with the part program. The same advantage accrues as on a co-ordinate measuring machine, namely the inspection part of the cycle using the probe 14 can be performed at a faster speed for the majority of the workpieces of a production run.

The method described is applicable to measurement probes used for scanning, as well as to trigger probes. As scanning takes place, these also are subject to errors caused by dynamic deflections. To apply the method to a scanning operation, a workpiece is first scanned at a slow speed, not appreciably subject to such errors. The scan is then repeated at a fast speed, and an error value calculated for each measured point on the workpiece, by subtracting the two corresponding readings, as before. A map is thus built up of the dynamic errors introduced by scanning at the fast speed. The error values thus obtained are used to correct measurements taken while scanning subsequent substantially identical workpieces at the fast speed.

I claim:

1. A method of inspecting a series of workpieces, in which a workpiece-sensing probe is moved into a position-sensing relationship with each workpiece and a position reading taken, the method comprising the following steps in any order in which (i) step (c) is performed after steps (a) and (b), and (ii) step (e) is performed after step (d):
   (a) moving the probe into the position-sensing relationship with one said workpiece at a relatively slow speed, and taking a position reading,
   (b) moving the probe into said position-sensing relationship with said one workpiece at a relatively fast speed, and taking a position reading,
   (c) recording a difference value representing the difference between the two readings of steps (a) and (b),
   (d) moving the probe into said position-sensing relationship with another said workpiece at the fast speed, and taking a position reading, and
   (e) using said recorded difference value to compensate the reading taken in step (d), thereby reducing any probe and dynamic errors in said reading;

wherein steps (a), (b) and (c) are repeated at a plurality of points on said one workpiece, and steps (d) and (e) are performed at each corresponding point on said other workpiece.

2. A method according to claim 1, wherein steps (d) and (e) are repeated on a succession of substantially identical workpieces.

3. A method according to claim 1, in which the probe is a trigger probe.

4. A method according to claim 3, in which the probe is calibrated or datumed at the relatively slow speed, giving an offset which is used to correct the reading in step (a).

5. A method according to claim 1, in which the probe is a measurement probe, and each of steps (a), (b) and (d) is performed as part of a scanning process.

6. A method of inspecting a series of identical workpieces, in which a workpiece sensing probe is moved into a position-sensing relationship with each workpiece and a position reading taken, the method comprising the following steps in any order in which (i) step (c) is performed after steps (a) and (b), and (ii) step (e) is performed after step (d):
   (a) moving the probe into a position-sensing relationship with at least one surface point of one workpiece at a relatively slow speed, and taking a position reading;
   (b) moving the probe into a position-sensing relationship with said surface point of said one workpiece at a relatively fast speed, and taking a position reading;
   (c) recording a difference value representing the difference between the two readings of steps (a) and (b);
   (d) moving the probe into said position-sensing relationship with another workpiece at a surface point corresponding to the surface point read on said one workpiece at said fast speed, and taking a position reading; and
   (e) using said recorded difference value to compensate the reading taken in step (d), thereby reducing any probe and dynamic errors in said reading.

7. A method according to claim 6, wherein steps (a), (b) and (c) are repeated at a plurality of points on said one workpiece, and then subsequently steps (d) and (e) are performed at each corresponding point on said other workpiece.

8. A method according to claim 6, wherein steps (d) and (e) are repeated on a succession of substantially identical workpieces.

9. A method according to claim 6, wherein the probe is a trigger probe.

10. A method according to claim 9 wherein the probe is calibrated or datumed at the relatively slow speed, giving an offset which is used to correct the reading in step (a).

11. A method according to claim 6, wherein the probe is a measurement probe, and each of steps (a), (b) and (d) is performed as part of a scanning process.

* * * * *